United States Patent
Navon

(10) Patent No.: US 9,641,429 B2
(45) Date of Patent: May 2, 2017

(54) PREDICTIVE TRAFFIC STEERING OVER SOFTWARE DEFINED NETWORKS

(71) Applicant: RADWARE, LTD., Tel Aviv (IL)

(72) Inventor: Amit Navon, Ramat Ha'Sharon (IL)

(73) Assignee: Radware, Ltd., Tel Aviv (IL)

( * ) Notice: Subject to any disclaimer, the term of this patent is extended or adjusted under 35 U.S.C. 154(b) by 0 days.

(21) Appl. No.: 14/339,903

(22) Filed: Jul. 24, 2014

(65) Prior Publication Data

US 2015/0372904 A1 Dec. 24, 2015

Related U.S. Application Data

(60) Provisional application No. 62/013,762, filed on Jun. 18, 2014.

(51) Int. Cl.
*G06F 15/173* (2006.01)
*H04L 12/721* (2013.01)
*H04L 12/851* (2013.01)
*H04L 12/725* (2013.01)
*H04L 12/859* (2013.01)

(52) U.S. Cl.
CPC ............ *H04L 45/38* (2013.01); *H04L 45/306* (2013.01); *H04L 47/24* (2013.01); *H04L 47/2475* (2013.01); *H04L 47/2425* (2013.01)

(58) Field of Classification Search
CPC ...... H04L 47/24; H04L 47/2425; H04L 45/38
USPC ................ 709/223–224, 232–235, 238–244; 370/229–231
See application file for complete search history.

(56) References Cited

U.S. PATENT DOCUMENTS

| 8,051,176 B2* | 11/2011 | Thomas ............... H04L 67/1008 709/224 |
| 9,210,078 B2* | 12/2015 | Shahar .................. H04L 45/306 |
| 9,391,901 B2* | 7/2016 | Shahar .................. H04L 45/306 |
| 2004/0093406 A1* | 5/2004 | Thomas ............... H04L 67/1008 709/224 |
| 2006/0233101 A1 | 10/2006 | Luft et al. |
| 2009/0074411 A1 | 3/2009 | Bernard et al. |
| 2009/0323536 A1 | 12/2009 | Liu et al. |
| 2010/0132031 A1 | 5/2010 | Zheng |
| 2011/0060851 A1 | 3/2011 | Monchiero et al. |
| 2011/0145902 A1 | 6/2011 | Kim et al. |

(Continued)

OTHER PUBLICATIONS

Salaets, "Optimizing Mobile VAS Service Platforms with Intelligent Traffic Steering", Technical Article, Updated Feb. 24, 2014, pp. 1-5.

*Primary Examiner* — Bharat N Barot
(74) *Attorney, Agent, or Firm* — M&B IP Analysts, LLC

(57) ABSTRACT

A method for predicative traffic steering over a software defined network (SDN). The method includes programming network elements in the SDN to forward an incoming traffic flow to an application-layer analysis device; receiving application-layer analysis results from the application-layer analysis device, wherein the application-layer analysis results provide association between at least one network-layer parameter, at least one application-layer parameter, and at least one application-layer service associated with the at least one application-layer parameter; and steering subsequent incoming traffic flows to at least one server configured to provide the at least one application-layer service based on the application-layer analysis results.

19 Claims, 5 Drawing Sheets

(56) References Cited

U.S. PATENT DOCUMENTS

| | | | |
|---|---|---|---|
| 2012/0084423 A1* | 4/2012 | McGleenon | H04L 61/1511 709/223 |
| 2012/0084460 A1* | 4/2012 | McGinnity | H04L 67/327 709/242 |
| 2013/0163426 A1 | 6/2013 | Beliveau et al. | |
| 2013/0163475 A1 | 6/2013 | Beliveau et al. | |
| 2013/0223442 A1 | 8/2013 | Narayanan et al. | |
| 2013/0347110 A1 | 12/2013 | Dalal | |
| 2014/0233385 A1 | 8/2014 | Beliveau et al. | |
| 2015/0295728 A1* | 10/2015 | Kadel | H04L 12/2863 370/235 |

* cited by examiner

| Source IP Address | Destination IP Address | Port IP | TCP Port | ... | URL | URL Path | User urgent | ... | L7 Services |
|---|---|---|---|---|---|---|---|---|---|
| - | IP - 2010 | - | - | ... | My-site1.com | - | IE | - | Content filtering |
| IP - 00010 | IP - 1001 | - | - | - | My-site2.com | - | IE | - | Content filtering |
| . | . | . | . | . | . | . | . | . | . |

PREDICTIVE TRAFFIC STEERING OVER SOFTWARE DEFINED NETWORKS

CROSS REFERENCE TO RELATED APPLICATIONS

This application claims the benefit of U.S. provisional application No. 62/013,762 filed on Jun. 18, 2014, the contents of which are hereby incorporated by reference.

TECHNICAL FIELD

This invention generally relates to software defined networks (SDN) and, particularly, to techniques for allowing predictive traffic steering over SDN.

BACKGROUND

A software defined network (SDN) is a relatively new type of networking architecture that provides centralized control of network elements rather than a distributed architecture utilized by conventional networks. That is, in a distributed architecture, each network element makes a routing decision based on the results of traffic processing and a distributed control mechanism. In contrast, in the SDN, a network element follows routing decisions received from a central controller. In detail, the operation of a network element can be logically divided into a "control path" and a "data path". In the control path, control protocols, e.g., for building in routing tables, are operable. In the data path, packet-processing operations are performed. Such operations include examining each input packet and making decisions based on the examination as to how to handle the input packet (e.g., packet forwarding, packet switching, bridging, load balancing, and so on). Furthermore, in a conventional network, network elements typically include both a control plane and a data plane, whereas in a SDN, the network elements include the data path, and the central controller implements the control path.

The SDN can be implemented in wide area networks (WANs), local area networks (LANs), the Internet, metropolitan area networks (MANs), ISP backbones, datacenters, and the like. Each network element in the SDN may be a router, a switch, a bridge, a load balancer, and so on, as well as any virtual instantiations thereof.

In one configuration of a SDN, the central controller communicates with the network elements using an OpenFlow protocol which provides a network abstraction layer for such communication. Specifically, the OpenFlow protocol allows adding programmability to network elements for the purpose of packets-processing operations under the control of the central controller, thereby allowing the central controller to define the traffic handling decisions in the network element.

Traffic received by a network element that supports the OpenFlow protocol is processed and routed according to a set of rules defined by the central controller based on the characteristics of the required network operation. Such a network element routes traffic according to a flow table and occasionally sends packets to the central controller. Each network element can be pre-configured with a flow table and can be modified by the central controller as required. The operation of network elements according to the OpenFlow protocol is further described in the "OpenFlow Switch Specification", Version 1.1.3, published on Apr. 16, 2012 by Open Networking Foundation, the contents of which are hereby incorporated by reference merely for the useful understanding of the background and without any limitations on the disclosed embodiments.

Thus, the OpenFlow protocol and SDN allow utilization of the hardware speed processing capability of conventional network elements while providing more flexibility in the traffic packet-processing decisions. As noted above, packets-processing operations include, but are not limited to, routing, load balancing, forwarding, switching, and bridging of packets. While the OpenFlow protocol allows the programmability of network elements in the SDN, this protocol does not allow for analyzing the traffic flows through SDN switches and controller. In particular, the currently defined SDN-based protocols (e.g., OpenFlow) are not designed for analyzing application layer (layer-7 or L7) parameters and attributes of the OSI module, but merely currently limited to classification of layer-4 network parameters. Typically, SDN-based switches and controllers can take routing decision based on MAC or network layers (L2 or L3) parameters. For example, the action to apply on each packet can be based on a source IP address and/or a destination IP address.

A significant challenge facing the services providers or network carriers arises due to the ample amount of applications offered to subscribers. Such applications may include video streaming, web browsing, security applications, instant messaging (IM), emails, peer-to-peer communication, mobile applications ("Apps"), and so on. The subscribers may connect to such data services through mobile devices (e.g., smartphones, tablet computers, etc.), laptop computers, desktop computers and the like, through a cellular network, a local area network (LAN), or the web.

Each such application is typically configured with different services per subscriber and/or type of application. Such services may include, for example, security, quality of service (QoS), quality of experience (QoE), parental control, access control, traffic optimization, analytic services, content filtering, and so on.

In order to provide the data services with their assigned provisions, application layer L7 processing is required, for example, to identify the application and/or protocol type associated with the flow of traffic. Furthermore, the application layer (L7) processing is required to take routing decisions per flow. Processing of application layer (L7) traffic demands high network and computing resources. This demand results in some major drawbacks on the utilization available. For example, extensive processing of traffic at the application layer (L7) would result in inefficient use of network bandwidth and computing resources, bottlenecks, and lack of coverage due to inability to rapidly respond to new networking and application requirements, reduced throughput, increased latency, and limited scalability of the network due to limited computing resources. In addition, the data services do not provide feedback regarding their performance. As a result, network paths can potentially be reprogrammed based on the application layer traffic analysis.

Although there are network appliances that are optimized to perform application layer (L7) traffic analysis, such appliances are expensive in terms of cost and utilization of network resources. Therefore, a straightforward approach of increasing the number of appliances is a costly solution that would be adopted by network carriers. Furthermore, the conventional network appliances are not designed to operate within SDNs. Specifically, conventional application layer (L7) network appliances cannot perform steering of traffic over SDNs.

It would therefore be advantageous to provide an efficient solution that provides for steering traffic in SDNs based on minimal processing of application layer traffic.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all embodiments. Its sole purpose is to present some concepts of one or more embodiments in a simplified form as a prelude to the more detailed description that is presented later. For convenience, the term some aspects may be used herein to refer to a single aspect or multiple aspects of the disclosure.

The disclosure relates in various embodiments to a method for predicative traffic steering over a software defined network (SDN). The method comprises programming network elements in the SDN to forward an incoming traffic flow to an application-layer analysis device; receiving application-layer analysis results from the application-layer analysis device, wherein the application-layer analysis results provide association between at least one network-layer parameter, at least one application-layer parameter, and at least one application-layer service associated with the at least one application-layer parameter; and steering subsequent incoming traffic flows to at least one server configured to provide the at least one application-layer service based on the application-layer analysis results.

The disclosure further relates in various embodiments to for predicative traffic steering over a software defined network (SDN). The system includes a processing unit; and a memory, the memory containing instructions that, when executed by the processing unit, configure the system to: program network elements in the SDN to forward an incoming traffic flow to an application-layer analysis device; receive application-layer analysis results from the application-layer analysis device, wherein the application-layer analysis results provide association between at least one network-layer parameter, at least one application-layer parameter, and at least one application-layer service associated with the at least one application-layer parameter; and steer subsequent incoming traffic flows to at least one server configured to provide the at least one application-layer service based on the application-layer analysis results.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

FIG. 2 illustrates a classification table generated by a central controller of the SDN.

DETAILED DESCRIPTION

Figure 1:
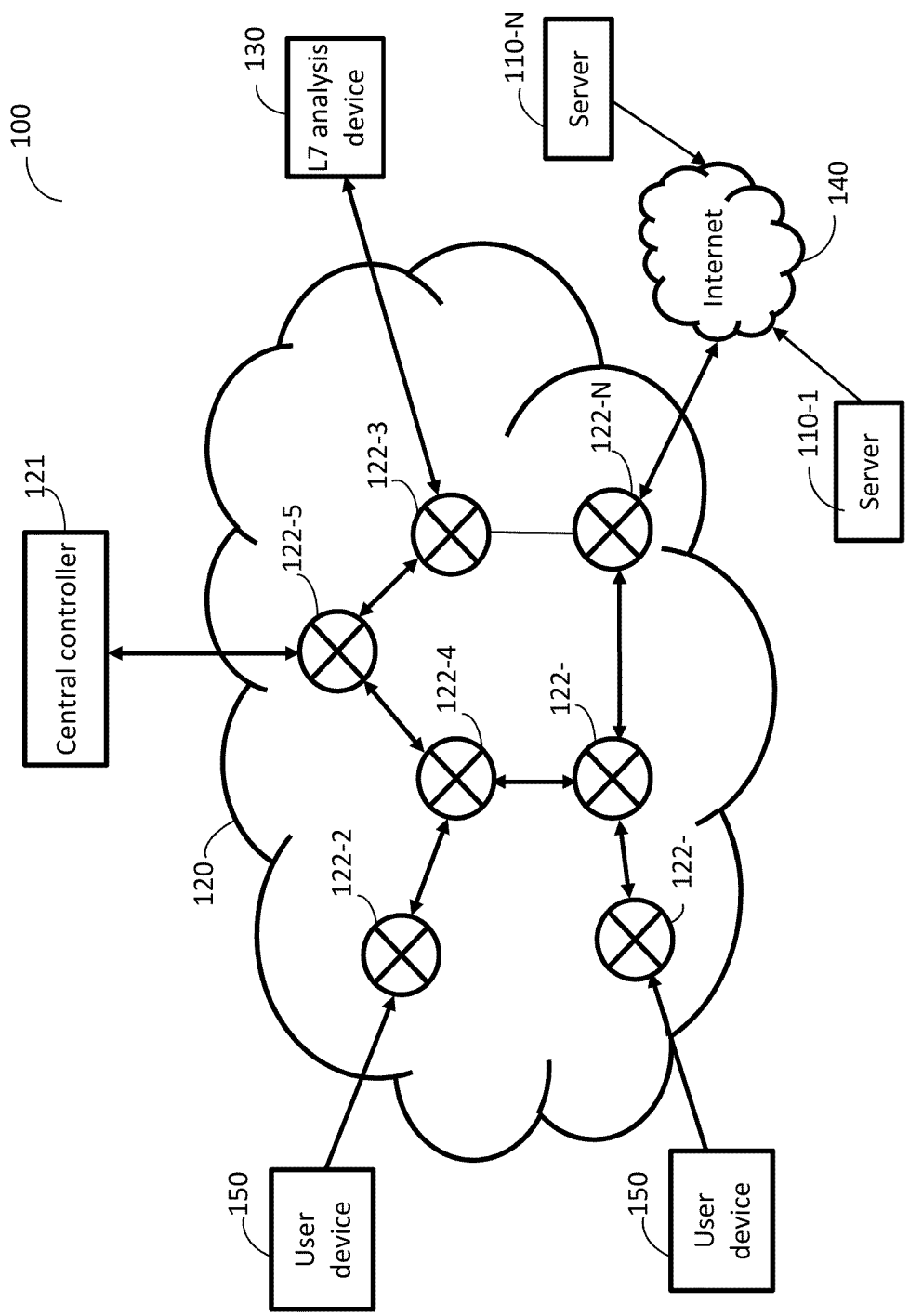
FIG. 1 illustrates a network system utilized to describe the various disclosed embodiments.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The embodiments disclosed herein provide an efficient system for traffic steering based, in part, on application layer traffic analysis. The traffic steering is performed over a software defined network (SDN) by means of a central controller and elements (e.g., switches) of such network. In an embodiment, the central controller of the SDN predicts the type of service of an incoming flow and causes the steering of flow to its destination according to a determined type of service associated with the flow. The prediction is based on inputs provided by a network appliance that performs the at least application layer (L7) traffic analysis. It should be noted that L7 traffic analysis refers to processing of network parameters included in application layers of the OSI model.

FIG. 1 shows an exemplary diagram of a network system 100 utilized to describe the various embodiments disclosed herein. The network system 100 includes a plurality of servers 110-1 through 110-N connected to a software defined network (SDN) 120 through the Internet 140.

The servers 110-1 through 110-N are configured to provide application layer services to user devices 150. Such services may include, but are not limited to, security (e.g., virus scan, spam filtering, attack mitigation, etc.), quality of service (QoS), quality of experience (QoE), parental control, access control (i.e., which subscriber can receive a particular service), traffic optimization, analytic services, content filtering, content caching, and so on. It should be noted that the servers may not be endpoints of the networks. That is, flows of traffic processed by the server 110 may be relayed back to the network 120 or may be terminated. The servers 110 may include analytic servers, security systems, cache servers, and the like.

A layer-7 (L7) analysis device 130 is also connected to the SDN 120. In one embodiment, the device 130 is an application delivery controller (ADC) appliance. An ADC typically distributes traffic between the servers to balance the load. Typically, the ADC is configured with traffic distribution rules that are based on the availability of the servers (health), the load on the servers, and other parameters, such as the application persistency rules, global load balancing, and so on.

In an embodiment, the application analysis includes inspection of hypertext transfer protocol (HTTP) parameters such as uniform resource locators (URLs), HTTP headers, host names, user names, cookies, and so on. The application layer (L7) analysis may also include inspection of the requested content. For example, such inspection may determine that a requested web page (identified by its URL) includes a relative number of scripts or multimedia content.

It should be appreciated that the HTTP is only one example of an application layer protocol, and that traffic of other protocols, including, but not limited to, SIP, FTP, and so on, can be processed as well. Thus, the disclosed embodiments are not limited to the analysis of HTTP parameters. As discussed in more detail herein below, the analysis or other inspection results of L7 parameters are typically utilized during a predictive learning mode of the SDN.

The SDN 120 includes a central controller 121 and a plurality of network elements 122-1 through 122-E. The SDN 120 can be implemented in wide WANs, LANs, the Internet, MANs, ISP backbones, datacenters, and the like. It should be noted that the SDN may be connected to a standard communication network. The central controller 121 defines a set of rules for the network elements 122. The set of rules defines at least how to handle traffic flows received at each network element. In an exemplary embodiment, the rules define how the network element 112 and/or server 110 steer the incoming traffic.

In one exemplary configuration, each network element 122 is a switch that implements SDN-based provisions protocols such as, e.g., the OpenFlow protocol, and communicates with the controller 121 via such protocol. In the exemplary deployment illustrated in FIG. 1, the network element 122-1 is connected at the edge of the SDN 120 and receives traffic from the clients or application servers (not shown) connected outside of the SDN. The network element 122-3 is connected at the other edge of the SDN 120 and communicates with the L7 analysis device 130. The network element 122-3 may also be an edge element communicatively connected to the servers 111.

It should be noted that the SDN 120 may include any number of network elements, each of which communicates with the central controller 121. It should be further noted that the SDN 120 may include a plurality of central controllers, each of which controls a group of network elements and can communicate with different ADCs locally or geographically connected to different sites. In addition, the plurality of central controllers may communicate with each other. The L7 analysis device 130 is also configured to communicate with the center controller 121.

According to various embodiments disclosed herein, the central controller 121 performs a predictive steering process. This predictive steering process utilizes L7 analysis and inspection results to allow fast L3 switching by the network elements 122 of the SDN 120. The predictive steering process includes two modes of operations: 1) learning and 2) L3 steering.

In various embodiments, the classification table (described in more detail herein below with respect to FIG. 2) is generated by analyzing a set of steering rules configured by a user (e.g., a system administrator). Thus, a classification table for an incoming flow is not generated by analyzing the traffic. The analysis of the steering rules may be performed by the central controller 121.

In the learning mode, all network elements 122 and, in particular, edge elements, are instructed to forward all incoming traffic to the L7 analysis device 130. This instruction can be performed by setting the elements 122 with a default rule indicating that unclassified traffic should be directed to the L7 analysis device 130. The unclassified traffic may be VLAN ID, a MAC address, an IP address, or a combination thereof that has not yet been associated with a type of service to be applied on the traffic. The controller 121 may receive information related to the unclassified traffic directed to the L7 analysis device 130. Such information may include a flow ID, and one of, or a combination of, a VLAN ID, a MAC address, and/or an IP address of the unclassified traffic.

The L7 analysis device 130 performs application layer (L7) analysis on the received traffic during the learning mode. As discussed herein above, such analysis includes at least inspection of the application layer (L7) parameters, such HTTP headers, URLs, host names, contents of the application, and so on. The L7 analysis device 130 is configured with the L7 services that should be assigned to the different flows. Thus, the L7 analysis device 130 can forward the traffic to the servers 111 based on the determined flows or perform action related to the service(s) associated with the flow. In an embodiment, the L7 analysis device 130 is configured to balance load traffic among the servers that provide the same service. The load balancing can be performed based on global load balancing criteria. Such criteria may include, but are not limited to, proximity between a client and site, latency, cost, and so on.

According to one embodiment, the L7 analysis device 130 sends the analysis and inspection results to the central controller 121. The controller 121 analyzes the results to generate a classification table. As illustrated in FIG. 2, the classification table includes a plurality of L3/L4 (network/transport layer) parameters 210, a plurality of L7 parameters 220, and one or more L7 services 230 associated with the plurality of L7 parameters. A L3/L4 parameter may include, for example, a source IP address, a destination IP address, an IP port, a TCP port, etc. A L7 parameter may include a URL (hostname), a URL path, cookie, filename, file type, XML tag, a domain name server (DNS) query various parameters in the header, etc. The services 230 are typically application layer services including, for example, security (e.g., virus scan, spam filtering, attack mitigation, etc.), quality of service (QoS), quality of experience (QoE), parental control, access control, traffic optimization, traffic acceleration, analytic services, content filtering, and so on.

The L7 services 230 and their respective parameters 220 are typically set by a user (e.g., a system administrator of a network carrier). As such, the L7 parameters are classified for L7 services by the network carrier. The classification criteria may be based on one or more L7 parameters having a predefined value. For example, as shown in FIG. 2, when the parameter URL equals 'my-site1.com' or 'my-site2.com' and the header value is 'user-agent=Internet-Explorer' then a content filtering should be applied. Classification criteria can be defined by the network carrier and such criteria are saved in the L7 analysis device 130 and central controller 121.

During the learning mode of operation, L3/L4 parameters are associated with L7 parameters and their respective services. In an embodiment, this operation can be performed by the L7 analysis device 130 when inspecting traffic directed thereto. Alternatively or collectively, associating L3/L4 parameters with L7 parameters may be performed by the central controller 121 using flow information received from the network elements and L7 analysis results provided by the L7 analysis device 130. The central controller 121 concludes the learning phase when the classification table includes sufficient information to generate steering rules by the controller 120. It should be noted that the classification table can be frequently updated even during the steering mode of operation. In an exemplary embodiment, the application layer (L7) analysis can be performed by a process executed by the central controller 121.

As noted above, the application layer (L7) analysis of the traffic either performed by the central controller 121 or by the L7 analysis device 130 consumes high networking and computing resources. According to one embodiment, in order to significantly reduce the utilization of such resources, once the classification table is ready, the central controller 121 switches to the steering mode. In the steering mode, traffic that is already classified is directed away from the L7 analysis device 130. In contrast, in the learning mode, traffic that is not already classified is directed to the L7 analysis device 130. Rather, such traffic is steered to a server 111 that can provide the services associated with the incoming traffic. The traffic steering is performed by using a set of steering rules created by the central controller 121. In addition, the network elements 122 are programmed, by the central controller 121, to handle traffic according to the created steering rules. It should be noted that each network element 121 can be configured with different sets of rules. For example, a first set of rules may divert unclassified traffic to the L7 analysis device 130 and a second set of rules may be the steering rules. It should be noted that the learning and steering modes discussed herein may be related to specific flows and do not necessarily relate to the entire operation of the SND 120 and/or the L7 analysis device 130.

In an embodiment, the steering rules define the destination node (which is typically either a server 111 or another element) to send a packet based on at least one L3/L4 parameter designated in the packet. The controller 121 generates the rules using the information included in the classification table, such as in the exemplary table shown in FIG. 2.

Non-limiting examples for a steering rule may include, but are not limited to:

1. IF: IP.DST_IP=IP_001
   Action: steer traffic to a network element connected to SEC_Server
2. Match: IP.DST_IP=IP_002 and IP.SRC_IP=IP_003
   Action: DROP In the first rule (1), the destination IP_001 is mapped to a URL of a protected website. Thus, traffic to this website should be sent to the security server (e.g., server 111-1) to check for suspicious activity. Although not shown in FIG. 1, the path between network elements to the servers 111 may also include "standard" network appliances such as switches, routers, firewall devices, and the like.

In the second rule (2), the destination IP address IP_002 is mapped to a URL of a website containing inappropriate content and the source IP address is a client that is designated as a client who should not view such content. In various embodiments, such designation may be predetermined. Thus, the action would be to drop the packet, thereby blocking the client from accessing the website. As discussed further herein above, the mapping of IP addresses (L3 parameters) to URLs (L7 parameters) is performed during the learning mode. Therefore, once the steering rules are created and applied by the user, no more L7 analysis is performed by the L7 analysis device 130 or the central controller.

According to another embodiment, the steering rule may include setting a "steering field" in a header of the packet to a predefined value. The steering field may be any predefined field in the IP (Layer-3) header or an Ethernet/MAC (Layer-2) header. The central controller 121 can modify the flow tables at the network elements 122, or can make any other supported programming operations, such that each element 122 would forward an incoming packet based on the value in the diversion field. As an example, steering may be based on any layer 2-4 parameter.

In a non-limiting embodiment, a source MAC address is set to a pre-defined unique value that can be used as an indication to steer the traffic to a specific server that provides a L7 service, without any intervention and interruption to network operation. Because the source MAC address is a unique number, it cannot be used by any other Ethernet network interfaces of the devices in the SDN 120, thereby setting the source MAC address field of the incoming packet, from an edge or peer network elements, to a unique predefined value that can be used as an indication as to the traffic diversion requirement.

In an embodiment, a set of such unique MAC addresses is defined to support diversion to multiple servers or systems that provide L7 services. In the layer-2 SDN-based networks, the MAC learning is typically performed by the central controller and not by each network element. As a result, the MAC learning operation in the network is not disturbed when the source MAC address is changed and used as a diversion value. In layer-3 SDN-based networks, no MAC learning is performed based on a source MAC address. However, each router is configured by the central controller to not update the source MAC address field when such field contains a per-defined unique value.

Figure 3:
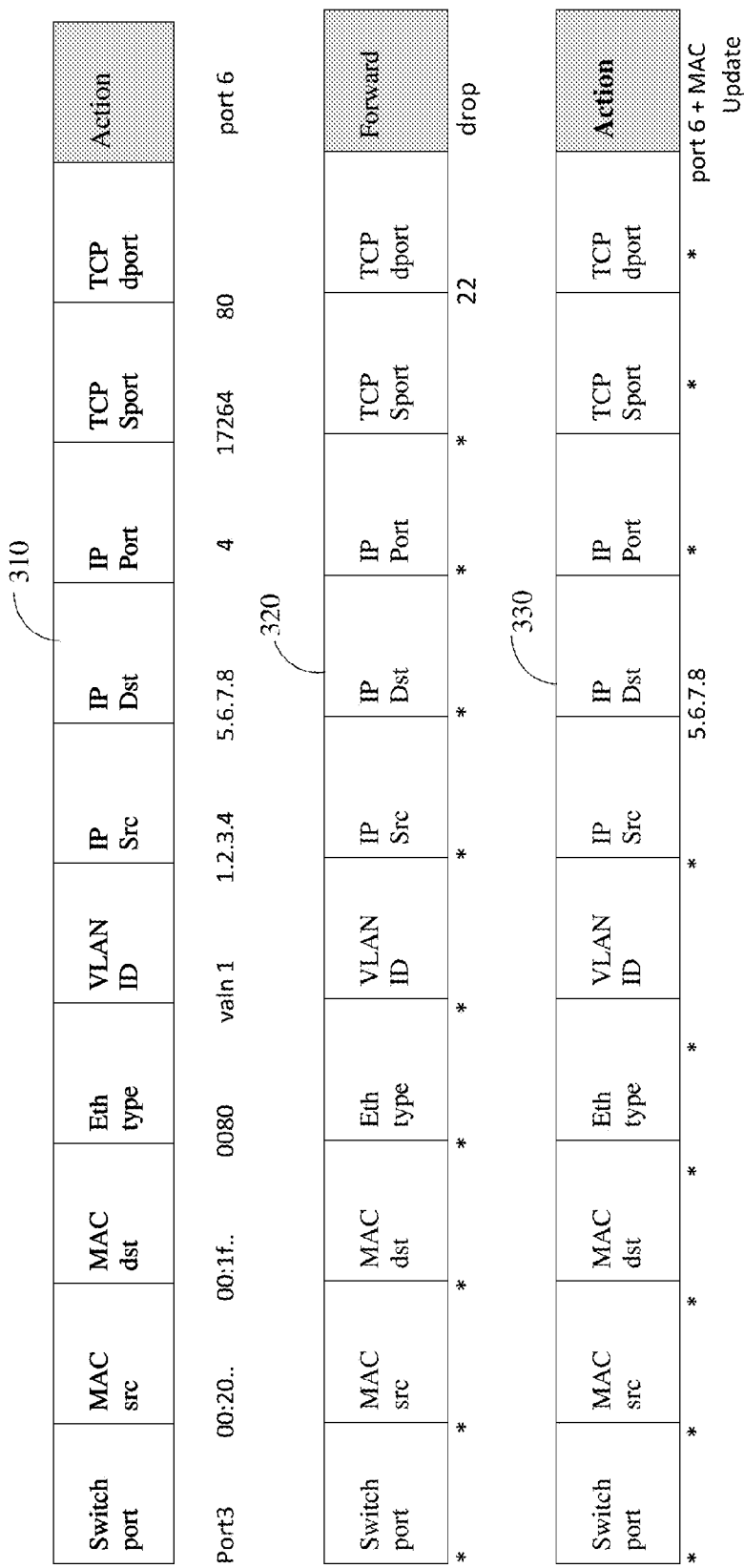
FIG. 3 illustrates exemplary steering rules utilized to program network elements of the SDN.

FIG. 3 shows an exemplary diagram for network parameters that may be utilized for steering rules according to an embodiment. A rule 310 defines a steering action based on application-level flow. In exemplary rule 310, the switch port, source MAC address, destination MAC address, Ethernet type VLAN ID, source IP address, destination IP address, and TCP source and destination ports appear as listed in FIG. 3. In this embodiment, the action for the network element is to route the packet through port 6. A rule 320 defines a steering action based on a firewall configuration. In this embodiment, all action packets designated with a TCP port number 22 should be dropped. A rule 330 shows steering actions based on IP destination value in the received packet. According to this embodiment, the action of the rule 330 is to send packets through 'port 6' and updated the MAC address of the packet.

It should be noted that the teachings disclosed herein are also applicable to hybrid networks in which a SDN is a sub-network of a conventional network in which its elements cannot be programmed by a central controller. To allow the proper operation of the methods disclosed above in the hybrid network, at least one of the network elements in the path to the servers 111 should be adapted to allow programmability by the central controller adapted to operate in a SDN-based network.

Figure 4:
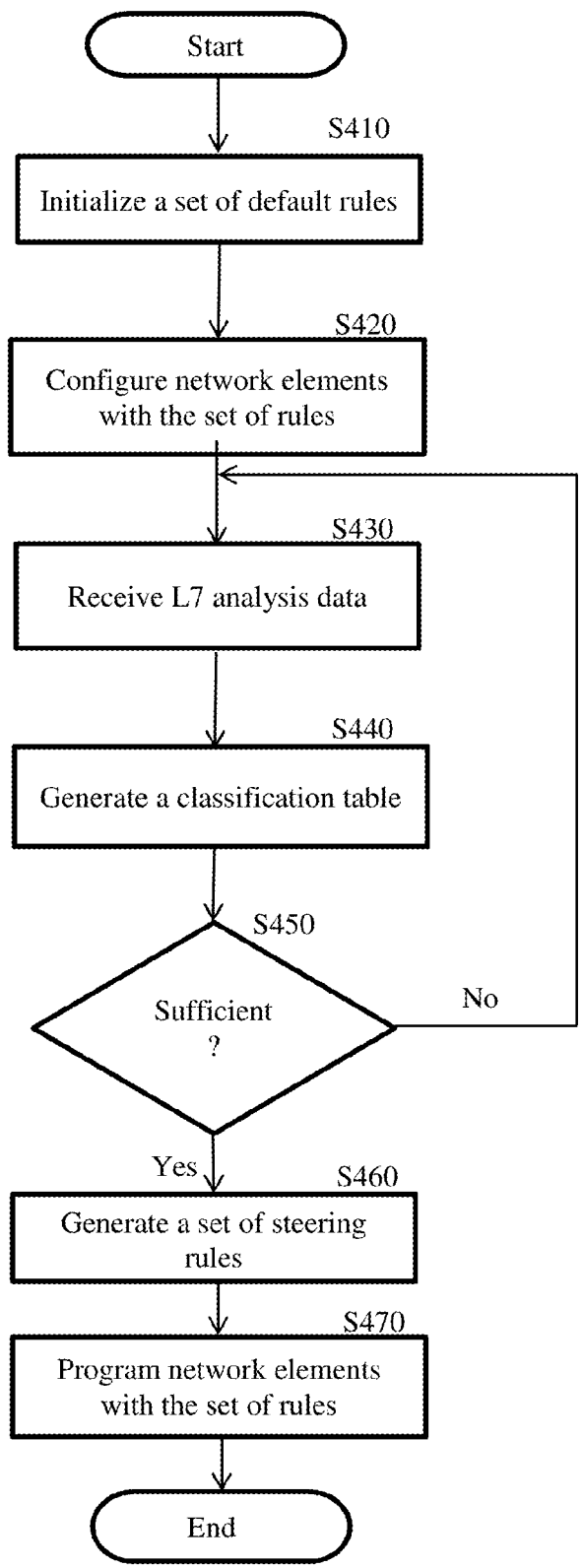
FIG. 4 is a flowchart describing a method for a predictive steering process according to one embodiment.

FIG. 4 shows an exemplary and non-limiting flowchart 400 illustrating a method for performing predictive steering of traffic according to one embodiment. In an embodiment, the method is performed by a central controller deployed and operable in a SDN. In another embodiment, one or more application layer (L7) services should be assigned to the traffic.

At S410, a set of default rules are initialized. In various embodiments, rules define that all unclassified traffic should be diverted to the L7 analysis device or the central controller for application layer (L7) analysis. In a further embodiment, the default rules also require the network elements to send flow information to the central controller. At S420, the network elements are programmed with the set of default rules.

At S430, the application layer (L7) analysis data is received. In an embodiment, such data may be received at a central controller (e.g., central controller 121). As noted above, such results include classification of L7 parameters to L7 services. In an embodiment, the application layer (L7) analysis is performed by a process executed by the central controller.

At S440, using the application layer (L7) analysis data, a classification table is generated. The classification table includes association or mapping of L3/L4 network parameters with or the classified L7 parameters and services included in the received results. An exemplary and non-limiting classification table is shown in FIG. 2. As noted above, L7 parameters and their respective L7 services may be set by a user or a system administrator. In an embodiment, the classification table is generated based on analysis of the set of steering rules associated with the user.

At S450, it is checked whether the classification table includes sufficient information to allow predication of a service that should be assigned or applied to incoming flow and, if so, execution continues with S460; otherwise, execution continues with S430. The classification table may be determined to include sufficient information if the classification table meets a sufficient information threshold. As a non-limiting example, such a threshold may be met if the table includes at least one mapping of at least one L3/L4 network parameter to at least one L7 service. A sufficient information threshold may be configured by the user. It should be noted that, once the threshold is met, no more L7 analysis of incoming traffic by the L7 analysis tool or the central control is required.

At S460, a set of steering rules are generated based on the information included in the classification table. The set of steering rules includes at least one rule. Each such rule defines a matching condition to at least one L3/L4 network parameter and at least one action. The action may define in part how or to where to divert or steer traffic received at a network element. Various examples for steering rules are provided above.

At S470, the network elements in the SDN are programmed by the central controller with the set of generated steering rules. As a result, traffic steering to servers that provide L7 services may be performed by the network elements based on these rules created. As mentioned above, this traffic steering may be performed without having to inspect or analyze traffic at the application layer. As a result, ADC and similar processes for performing L7 analysis do not need to be conducted at this stage. This allows minimization or elimination of the utilization of networking and computing resources traditionally allocated to L7 analysis processes.

It should be noted that S410 through S450 are typically performed during the learning mode of operation while S460 and S470 are generally performed during the steering mode of operation.

The following is a non-limiting example for the operation of a predictive steering process. Network carriers typically require transparent HTTP traffic redirection to a cache server for a white list of URLs. For instance, 20% of the traffic is cached, while the remaining 80% of the traffic should be routed to the Internet. Currently, all traffic is inspected at the application layer (L7) by a L7 analysis device. The central controller can enforce the correct steering action according to the HTTP host header information.

According to various disclosed embodiments, during the learning mode, traffic is analyzed to find a match between a URL and its respective IP address. This may be performed by querying a domain name server (DNS). The IP addresses of URLs requiring caching will be added to the classification table.

Thereafter, a set of steering rules are created. As an example, the rule may be:
1. IF: IP.DST_IP=IP_005
   Action: steer traffic to Cache Server
where 'IP_005' is a destination IP address of a URL that requires caching. The network elements are programmed with the steering rules. It should be noted that packets having destination addresses according to the above rule are not typically forwarded to the L7 analysis device.

It should be appreciated that the added flexibility to provision L7 classification rules along with existing L3-L4, through SDN architecture (an application aware network) enable faster delivery of new services in a cost effective manner. This approach further eliminates the need for networking-computing intensive L7 analysis of high volume traffic in the data path.

Figure 5:
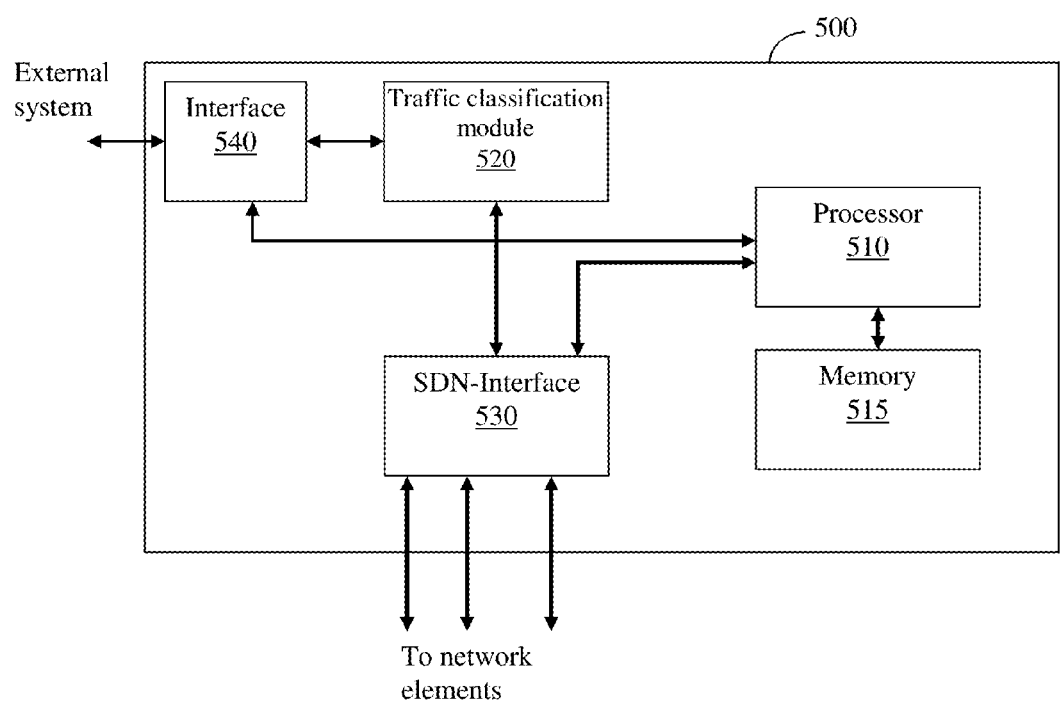
FIG. 5 shows an exemplary and non-limiting block diagram of the central controller constructed according to one embodiment.

FIG. 5 shows an exemplary and non-limiting block diagram of a central controller 500 constructed according to one embodiment. The central controller 500 is operable in SDNs and is often at least configured to execute the predictive steering process described in greater detail above with respect to FIG. 4. The controller 500 includes a processor 510 communicatively connected to a memory 515, a traffic classification module 520, a SDN-interface module 530, and an interface module 540 to an external system such as, but not limited to, an ADC device. In various embodiments, the memory 515 may contain instructions that, when executed by the processor 510, configure the controller 500 to perform the predictive steering process described in more detail herein above with respect to FIG. 4.

The SDN-interface module 530 allows the communication with the network elements of the SDN. In one embodiment, such communication uses the OpenFlow protocol through which a secure channel may be established with each network element. The traffic classification module 520 is configured to receive L7 analysis data from the ADC and to generate the classification table. In addition, the traffic classification module 520 generates the steering rules as discussed in further detail herein above. The traffic classification module 520 is configured to communicate with the network elements through the SDN-interface 530. In an embodiment, the traffic classification module 520 can execute an application layer analysis process to inspect traffic at this layer. As noted above, such analysis is performed only on unclassified packets.

The processor 510 uses instructions stored in the memory 515 to execute tasks traditionally performed by the central controllers of SDN and optionally for execution of the tasks performed by the modules 520, 530, and 540. The central controller 500 in another embodiment includes a combination of application specific integrated circuits and processors. In a further embodiment, the controller 500 is distributed across several devices and processors.

In another embodiment, the modules 520, 530 and 540 of the controller 500 can be realized by one or more processing systems. A processing system may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The foregoing detailed description has set forth a few of the many forms that different embodiments can take. It is intended that the foregoing detailed description be understood as an illustration of selected forms of the various embodiments and not as limiting the scope of the disclosed embodiments.

Most preferably, the various embodiments discussed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

What is claimed is:

1. A method for predicative traffic steering in a software defined network (SDN) having a central controller and network elements, comprising:
    transmitting first instructions from the central controller toward at least one of the network elements in the SDN to cause the at least one network element receiving the instructions to forward an incoming traffic flow to an application-layer analysis device;
    receiving, by the central controller, application-layer analysis results from the application-layer analysis device, wherein the application-layer analysis results provide an association between at least one network-layer parameter, at least one application-layer parameter, and at least one application-layer service associated with the at least one application-layer parameter; and
    transmitting second instructions from the central controller toward at least one of the network elements in the SDN to cause the at least one of the network elements receiving the second instructions to steer subsequent incoming traffic flows to at least one server configured to provide the at least one application-layer service based on the application-layer analysis results.

2. The method of claim 1, further comprising:
    determining if the application-layer analysis results are sufficient to predict steering of the subsequent incoming traffic flows; and
    transmitting third instructions from the central controller toward at least one of the network elements in the SDN to stop forwarding incoming traffic flows to the application-layer analysis device upon determination that the application-layer analysis results are sufficient.

3. The method of claim 1, further comprising:
    responsive to the application-layer analysis results, generating a classification table by the central controller, wherein the classification table includes a mapping of the at least one network-layer parameter to the at least one application-layer parameter and the respective at least one application-layer service.

4. The method of claim 3, wherein the at least one application-layer parameter and the respective at least one application-layer service are preconfigured.

5. The method of claim 1, wherein transmitting second instructions further comprises:
    defining at least one steering rule based on the application-layer analysis results;
    including in the second instructions to cause the at least one of the network elements receiving the second instructions to forward packets of the subsequent incoming traffic flows to the at least one server based on the at least one steering rule.

6. The method of claim 5, wherein the at least one steering rule defines an action to perform on a packet received at a network element based on at least one network parameter designated in the packet.

7. The method of claim 6, wherein the at least one network parameter is any one of: a source IP, a destination IP address, a port number, and a layer-4 protocol type.

8. The method of claim 1, wherein an OpenFlow protocol is utilized for communication between the central controller and the network elements.

9. The method of claim 1, wherein the at least one application-layer service is any one of: a virus scan, a spam filtering, a cyber-attack mitigation, quality of service (QoS), quality of experience (QoE), a parental control, an access control, traffic optimization, an analytic service, content filtering, and content caching.

10. A non-transitory computer readable medium having stored thereon instructions for causing one or more processing units of the central controller to execute the method according to claim 1.

11. A central controller for predicative traffic steering in a software defined network (SDN) having network elements, comprising:
    a processing unit; and
    a memory, the memory containing instructions that, when executed by the processing unit, configure the central controller to:
    transmit first instructions from the central controller toward at least one of the network elements in the SDN to cause the at least one network element receiving the instructions to forward an incoming traffic flow to an application-layer analysis device;
    receive application-layer analysis results from the application-layer analysis device, wherein the application-layer analysis results provide association between at least one network-layer parameter, at least one application-layer parameter, and at least one application-layer service associated with the at least one application-layer parameter; and
    transmit second instructions toward at least one of the network elements in the SDN to cause the at least one of the network elements receiving the second instructions to steer subsequent incoming traffic flows to at least one server configured to provide the at least one application-layer service based on the application-layer analysis results.

12. The central controller of claim 11, wherein the central controller is further configured to:
    determine if the application-layer analysis results are sufficient to predict steering of the subsequent incoming traffic flows; and
    transmit third instructions from the central controller toward at least one of the network elements in the SDN to stop forwarding incoming traffic flow to the application-layer analysis device upon determination that the application-layer analysis results are sufficient.

13. The central controller of claim 11, wherein the central controller is further configured to:
generate a classification table, wherein the classification table includes a mapping of the at least one network-layer parameter to the at least one application-layer parameter and to the respective at least one application-layer service.

14. The central controller of claim 13, wherein the at least one application-layer parameter and the respective at least one application-layer service are preconfigured.

15. The central controller of claim 11, wherein the central controller is further configured to:
define at least one steering rule based on the application-layer analysis results; and
include in the second instructions instructions to cause the at least one of the network elements receiving the second instructions to forward packets of the subsequent incoming traffic flows to the at least one server based on the at least one steering rule.

16. The central controller of claim 15, wherein the at least one steering rule defines an action to perform on a packet received at a network element based on at least one network parameter designated in the packet.

17. The central controller of claim 16, wherein the at least one network element is any one of: a source IP, a destination IP address, a port number, and a layer-4 protocol type.

18. The central controller of claim 11, wherein an Open-Flow protocol is utilized for communication with the network elements.

19. The central controller of claim 11, wherein the at least one application-layer service is any one of: a virus scan, a spam filtering, a cyber-attack mitigation, quality of service (QoS), quality of experience (QoE), a parental control, an access control, traffic optimization, an analytic service, content filtering, and content caching.

* * * * *